(12) United States Patent
Arakelian et al.

(10) Patent No.: US 9,197,522 B1
(45) Date of Patent: Nov. 24, 2015

(54) NATIVE STORAGE DATA COLLECTION USING MULTIPLE DATA COLLECTION PLUG-INS INSTALLED IN A COMPONENT SEPARATE FROM DATA SOURCES OF ONE OR MORE STORAGE AREA NETWORKS

(75) Inventors: Mark Adam Arakelian, Shirley, MA (US); Christopher A. Chaulk, Franklin, MA (US); Robert A. Lincourt, Jr., Pawtucket, RI (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/425,528

(22) Filed: Mar. 21, 2012

(51) Int. Cl.
*G06F 15/16* (2006.01)
*H04L 12/26* (2006.01)
*G06F 11/30* (2006.01)

(52) U.S. Cl.
CPC ............ *H04L 43/08* (2013.01); *G06F 11/3034* (2013.01); *H04L 43/14* (2013.01)

(58) Field of Classification Search
CPC ..... H04L 43/08–43/0894; H04L 43/10–43/18; H04L 43/00; H04L 43/14; G06F 11/3006; G06F 11/3034; G06F 11/3037
USPC .......................... 709/223, 224; 370/254–257
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,434,637 B1 | 8/2002 | D'Errico | |
| 6,622,221 B1 | 9/2003 | Zahavi | |
| 6,654,782 B1 * | 11/2003 | O'Brien et al. | 709/201 |
| 6,772,408 B1 * | 8/2004 | Velonis et al. | 717/100 |
| 6,892,236 B1 * | 5/2005 | Conrad et al. | 709/224 |
| 7,254,814 B1 * | 8/2007 | Cormier et al. | 718/106 |
| 7,286,967 B2 * | 10/2007 | Simes | 702/185 |
| 7,292,969 B1 | 11/2007 | Aharoni et al. | |
| 7,315,807 B1 * | 1/2008 | Lavallee et al. | 703/21 |

(Continued)

OTHER PUBLICATIONS

EMC Corporation, "EMC Ionix ControlCenter (formerly EMC ControlCenter) 6.0 StorageScope: Best Practices Planning," White Paper H4154, Jun. 2009, 43 pp.

(Continued)

*Primary Examiner* — Lance L Barry
(74) *Attorney, Agent, or Firm* — Muirhead and Saturnell, LLC

(57) ABSTRACT

A native data collection component may be implemented as a tool, appliance, application and/or utility, and including physical and/or logical implementations thereof. The native data collection component may be responsible for data orchestration, data collection, and aggregation and distribution of collected data from among multiple sources of a storage area network (SAN). The native data collection component is not required to be installed as an agent on any data source of the SAN, and the native data collection component may be independent of a particular data source and act as an independent performance characteristic collection mechanism. In an embodiment, the native data collection component may include three devices/sub-components: a data orchestration device, a data collection interface and a data aggregation and distribution device. Each sub-component may be service based and communication with each service may be done using state-less protocols.

14 Claims, 10 Drawing Sheets

(56) References Cited

U.S. PATENT DOCUMENTS

| | | | |
|---|---|---|---|
| 7,392,360 | B1 | 6/2008 | Aharoni et al. |
| 7,441,023 | B2 | 10/2008 | Benjamin et al. |
| 7,475,076 | B1* | 1/2009 | Shmuylovich et al. ........ 709/223 |
| 7,627,669 | B2* | 12/2009 | Dugatkin et al. ............. 709/224 |
| 7,640,345 | B2* | 12/2009 | Nair et al. .................... 709/226 |
| 7,688,753 | B1 | 3/2010 | Zimran et al. |
| 7,720,003 | B2 | 5/2010 | Benjamin et al. |
| 7,779,291 | B2 | 8/2010 | Yoder et al. |
| 7,783,778 | B2 | 8/2010 | Benjamin |
| 7,840,664 | B2* | 11/2010 | Dugatkin et al. ............. 709/224 |
| 8,028,062 | B1 | 9/2011 | Wigmore et al. |
| 2003/0055931 | A1* | 3/2003 | Cravo De Almeida et al. ......... 709/223 |
| 2005/0086554 | A1* | 4/2005 | Simes ................................ 714/4 |
| 2008/0040074 | A1* | 2/2008 | Simes ........................... 702/185 |
| 2008/0306712 | A1* | 12/2008 | Chen ............................. 702/186 |
| 2013/0166729 | A1* | 6/2013 | Gole et al. .................... 709/224 |

OTHER PUBLICATIONS

EMC Corporation, "EMC Symmetrix Storage Management Solution," Data Sheet H6194.2, Nov. 2010, 5 pp.

EMC Corporation, "ProSphere Discovery and Monitoring for the Modern Data Center," White Paper H8890, Aug. 2011, 17 pp.

U.S. Appl. No. 12/807,943, filed Sep. 17, 2010, Colon et al.

U.S. Appl. No. 13/065,806, filed Mar. 30, 2011, Smirnov et al.

U.S. Appl. No. 13/335,316, filed Dec. 22, 2011, Lim et al.

EMC Corporation, "ProSphere: Next Generation Storage Resource Management," White Paper H8886, Aug. 2011, 13 pp.

EMC Corporation, "Diagnosing Performance Issues With ProSphere: An Introduction to Use Cases and Architecture," White Paper H8935, Sep. 2011, 14 pp.

* cited by examiner

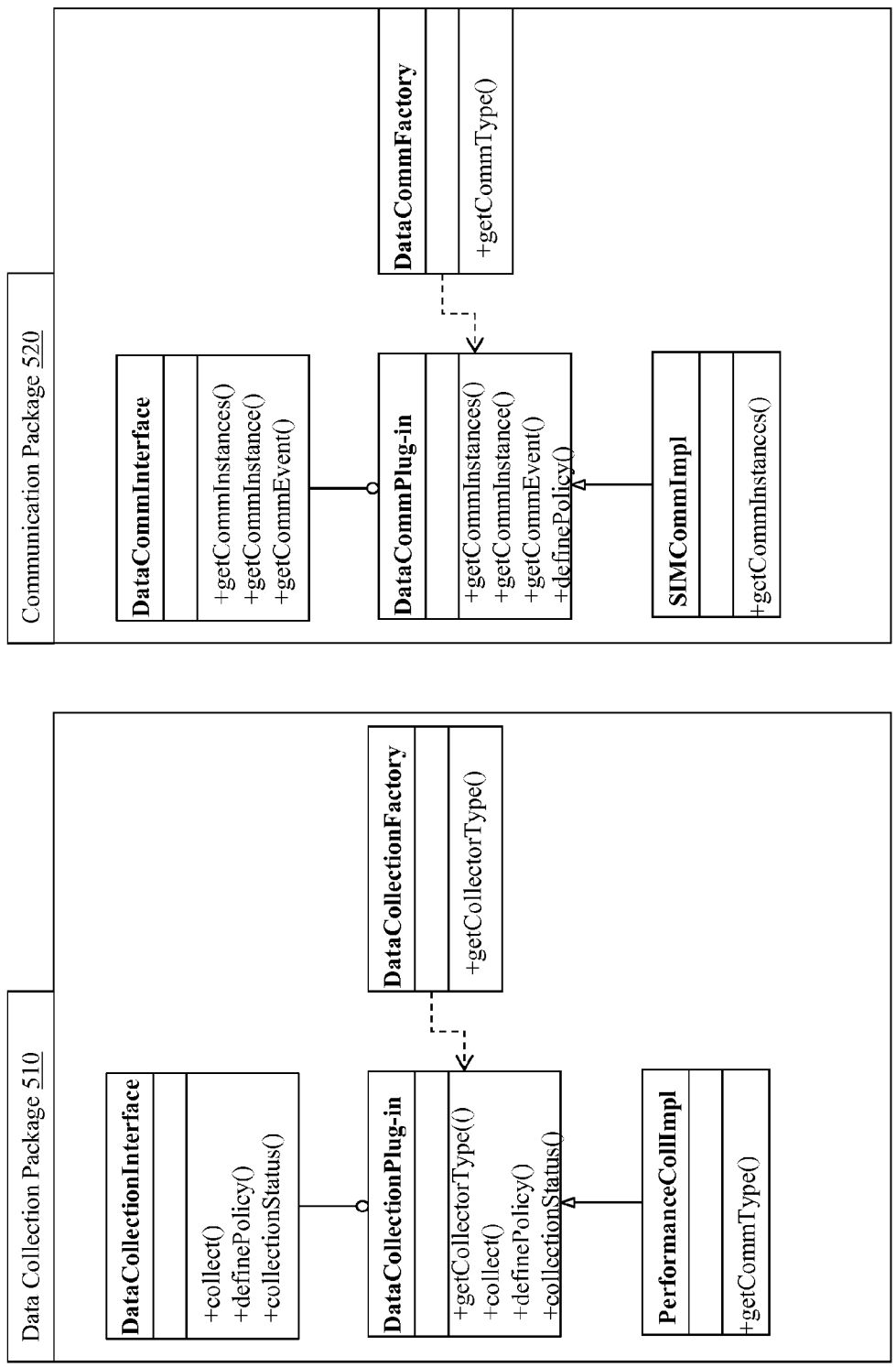

NATIVE STORAGE DATA COLLECTION USING MULTIPLE DATA COLLECTION PLUG-INS INSTALLED IN A COMPONENT SEPARATE FROM DATA SOURCES OF ONE OR MORE STORAGE AREA NETWORKS

TECHNICAL FIELD

This application relates to storage area networks and, more particularly, to the field of data collection for storage management.

BACKGROUND OF THE INVENTION

Host processor systems may store and retrieve data using storage devices (also referred to as storage arrays) containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

SAN characteristics of the storage devices and/or other elements of a storage area network (SAN) may be monitored according to different performance, capacity, topology and configuration data statistics and measures. SAN characteristics may include, for example, performance data, capacity data, discovery data, including configuration data and/or topology data, among other characteristics. As an example, performance characteristics of input/output (I/O) data paths among storage devices and components may be measured and may include I/O operations initiated by a host will result in corresponding activity in SAN fabric links, storage array ports and adapters, and storage volumes, measured in I/Os per second and Megabytes per second. Other characteristics may similarly be measured. Such characteristics may be significant factors in managing storage system performance, for example, in analyzing use of lowering access performance versus more expensive higher performance disk drives in a SAN, or by expanding number of SAN channels or channel capacity. Users may balance performance, capacity and costs when considering how and whether to replace and/or modify one or more storage devices or components.

Known performance characteristic collection techniques may include use of one or more agents installed on each of multiple sources in order to collect data for the multiple sources. For example, virtual hosts (e.g., hosts running as guest operating systems or virtual machines (VM's)) may be created in a cluster of physical hosts which rely for I/O transport on previously-created, or dynamically changing, I/O data paths. In various circumstances, the use of such agents for data collection may be intrusive and require significant use of computing resources.

Accordingly, it would be desirable to provide a system that may be advantageously used for data collection, particularly in connection with providing a flexible data collection mechanism that may facilitate a standardized mechanism for data collection among multiple sources.

SUMMARY OF THE INVENTION

According to the system described herein, a method for performing native data collection includes receiving a request for data collection. Characteristics for collection are identified according to the request. Using at least one processor, a software structure is instantiated to collect identified data according to the characteristics identified from the request. Using the software structure, the identified data is collected using a sharable communication interface that is usable to access data from multiple data sources that operate using different communication types. The request may be provided according to a policy in response to a triggering event. The identified data may be storage data of a storage area network. The characteristics may include performance data, capacity data and/or discovery data. The software structure may include least one out of a plurality of data collection plug-ins. The plurality of data collection plug-ins may include a performance data collection plug-in, a capacity data collection plug-in and a discovery data collection plug-in. The multiple data sources may be accessed via the sharable communication interface using at least one data communication plug-in. The method may further include distributing the collected data responsive to the request.

According further to the system described herein, a non-transitory computer readable medium stores software for performing native data collection. The software includes executable code that receives a request for data collection. Executable code is provided that identifies characteristics for collection according to the request. Executable code is provided that instantiates a software structure to collect identified data according to the characteristics identified from the request. Executable code is provided that collects, using the software structure, the identified data using a sharable communication interface that is usable to access data from multiple data sources that operate using different communication types. The request may be provided according to a policy in response to a triggering event. The identified data may be storage data of a storage area network. The characteristics may include performance data, capacity data and/or discovery data. The software structure may include least one out of a plurality of data collection plug-ins. The plurality of data collection plug-ins may include a performance data collection plug-in, a capacity data collection plug-in and a discovery data collection plug-in. The multiple data sources may be accessed via the sharable communication interface using at least one data communication plug-in. Executable code may further be provided that aggregates and distributes the collected data responsive to the request.

According further to the system described herein, a system for performing native data collection includes at least one processor executing software on a computer readable medium. The software is executed to provide a data orchestration component that processes a received request data collection and schedules a data collection job according to characteristics identified from the request. The software further provides a data collection interface that collects data according to the data collection job, wherein the data collection interface enables a software structure to collect identified data according to the characteristics identified from the request, and wherein the data collection interface includes a sharable communication interface that is usable to access data from multiple data sources that operate using different communication types. The software is further executed to provide a data aggregation and distribution component that aggregates and distributes the collected data responsive to the request. The characteristics may include at least one of: performance data, capacity data or discovery data. The software structure may include at least one out of a plurality of data collection plug-ins, the plurality of data collection plug-ins including a performance data collection plug-in, a capacity data collection plug-in and a discovery data collection plug-in.

BRIEF DESCRIPTION OF THE DRAWINGS

Embodiments of the system are described with reference to the several figures of the drawings, which are briefly described as follows.

FIGS. 10A and 10B are schematic illustrations showing a domain model, outlining the framework package structures for implementing the data collection framework and the shared communication framework according to various embodiments of the system described herein.

DETAILED DESCRIPTION OF VARIOUS EMBODIMENTS

Figure 1:
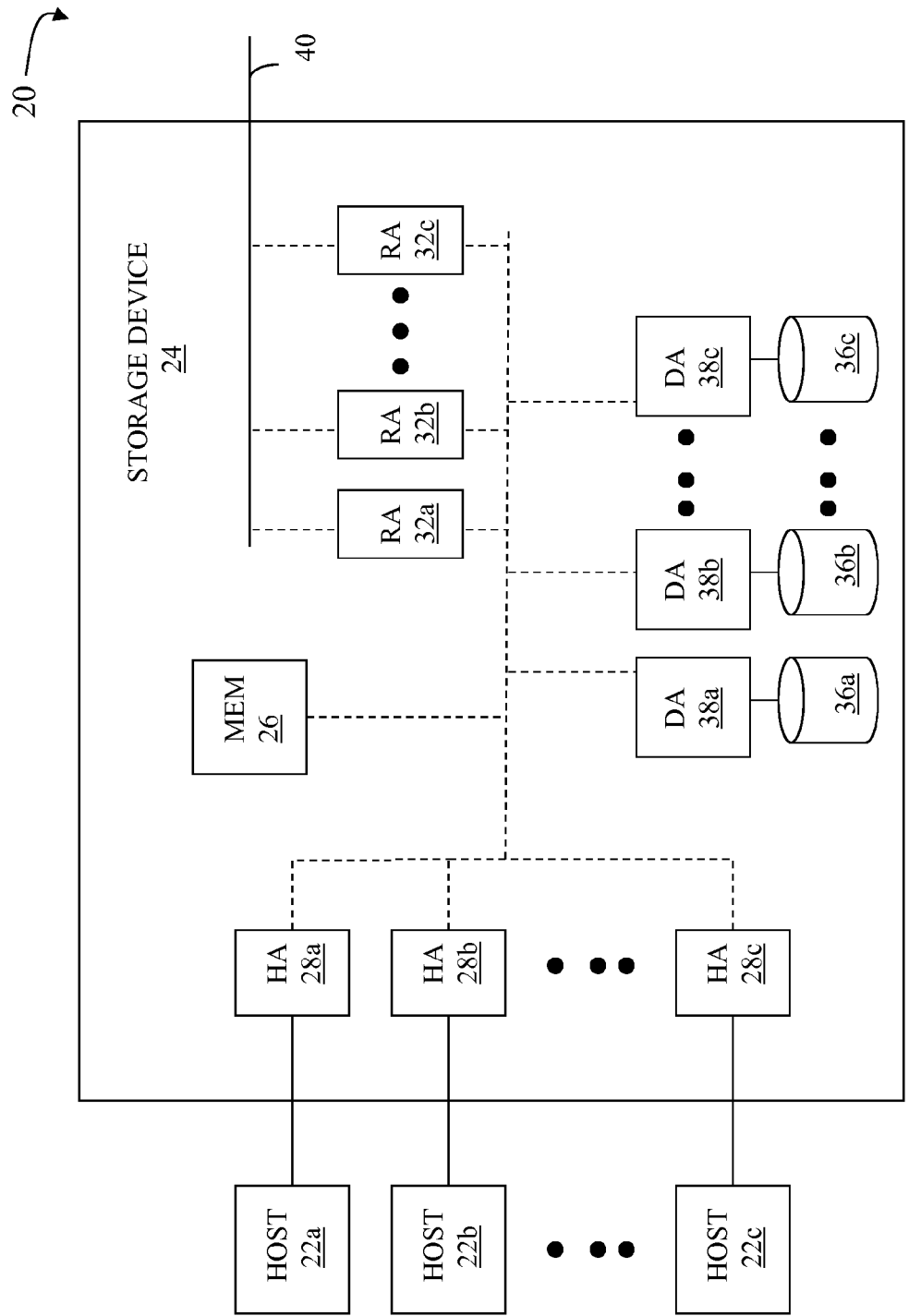
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24 that may be used in connection with an embodiment of the system described herein. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts. In various embodiments, the storage device 24 may be, for example, a Symmetrix storage device and/or a CLARiiON storage device produced by EMC Corporation of Hopkinton, Mass.

In an embodiment, the storage device 24 may include one or more remote adapter units (RA's) 32a-32c. RA's may be used in connection with a Remote Data Facility (RDF) product produced by EMC Corporation that may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to a communication link 40 and are similar to the HA's 28a-28c, but are used to transfer data between the storage device 24 and other storage devices that are also coupled to the communication link 40. The storage device 24 may be coupled to additional communication links (not shown) in addition to the communication link 40. For further discussion of RDF and the use thereof in data recovery and storage techniques, see, for example, U.S. Pat. No. 5,742,792 to Yanai, et al., entitled "Remote Data Mirroring" and U.S. Pat. No. 7,779,291 to Yoder et al., entitled "Four Site Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk. It is noted that the term "data" as used herein may be appropriately understood, in various embodiments, to refer to data files, extents, blocks, chunks and/or other designations that indicate a unit, segment or collection of data.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal buses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail. The storage device 24 may be provided as a standalone device coupled to the hosts 22a-22c as shown in FIG. 1 or, alternatively, the storage device 24 may be part of, and/or otherwise coupled to, a storage area network (SAN) that may include a plurality of other storage devices as well as switches, routers, network connections, etc., as further discussed elsewhere herein.

Figure 2:
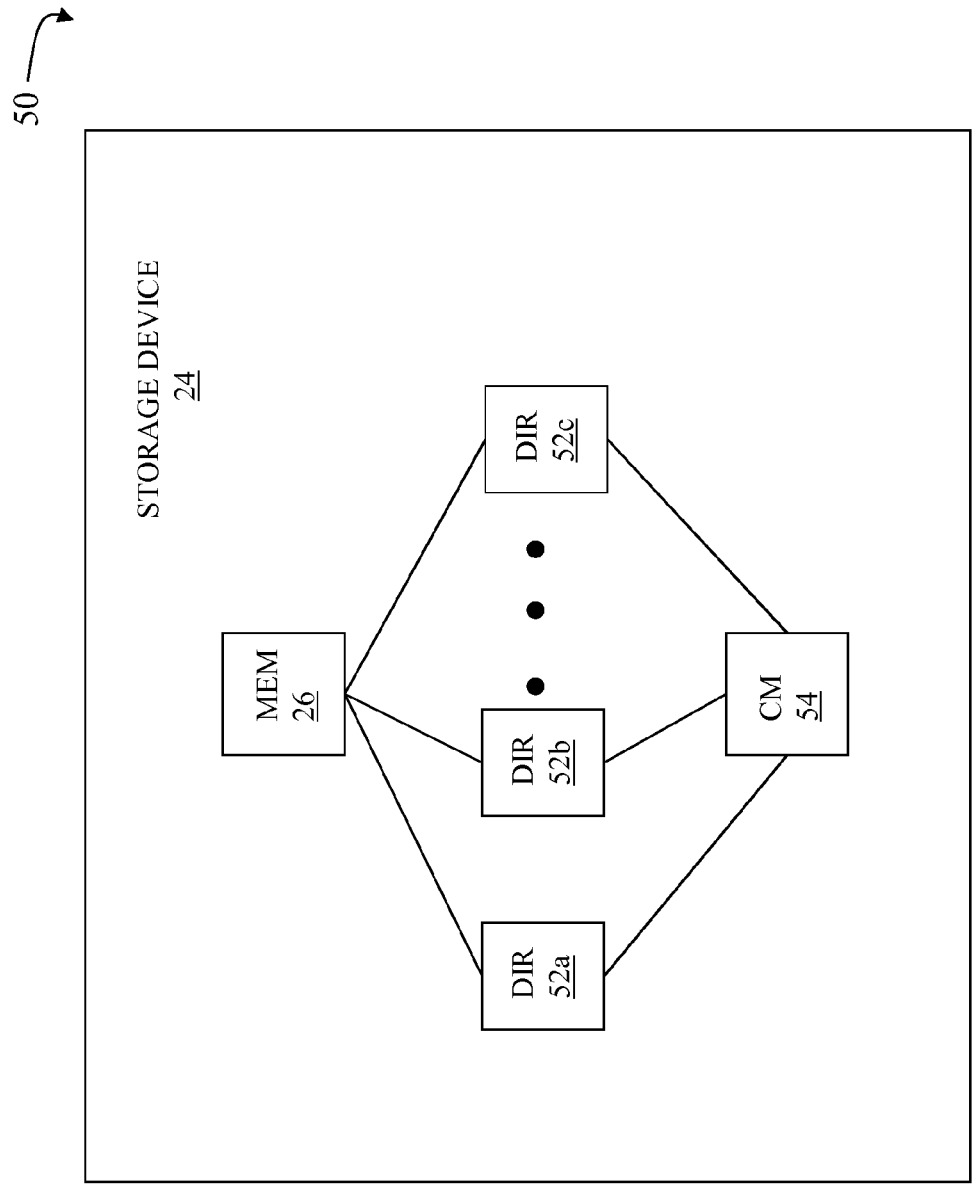
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some instances, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host devices with one or more storage devices in a manner that allows reconfiguring connections without having to physically disconnect and reconnect cables from and to ports of the devices. A storage area network may be implemented using one or more switches to which the storage devices and the host devices are coupled. The switches may be programmed to allow connections between specific ports of devices coupled to the switches. A port that can initiate a data-path connection may be called an "initiator" port while the other port may be deemed a "target" port.

Figure 3:
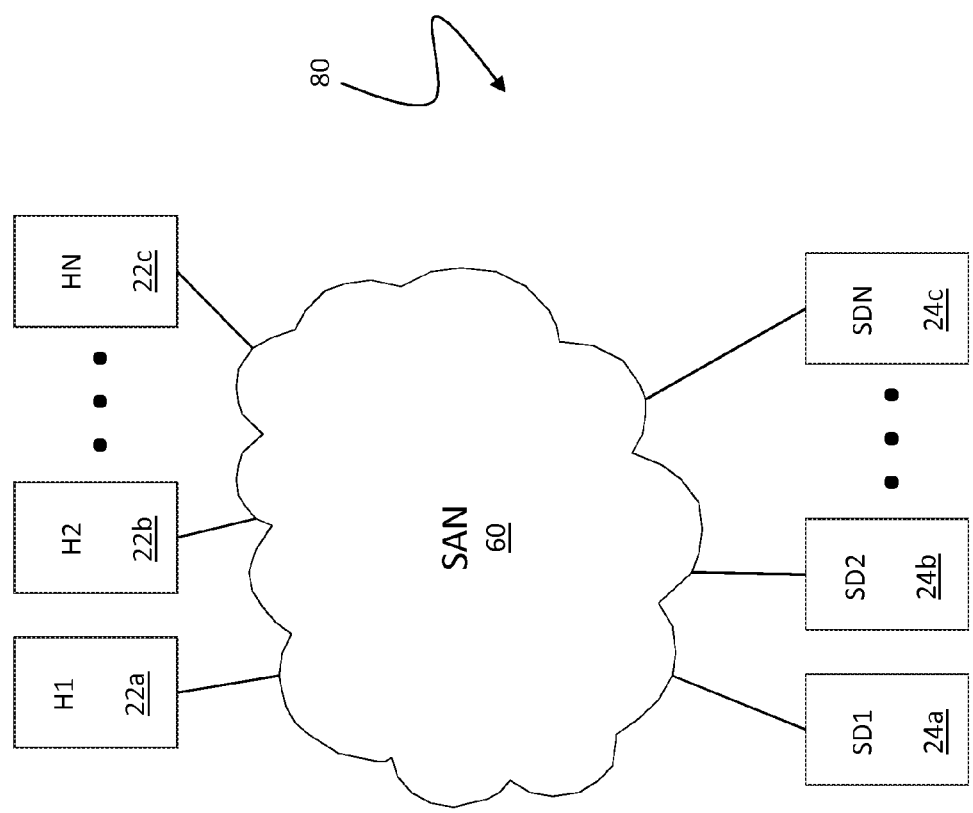
FIG. 3 is a schematic diagram showing a plurality of hosts coupled to a plurality of storage devices via a storage array network (SAN).

FIG. 3 is a schematic illustration 80 showing a storage area network (SAN) 60 providing a SAN fabric coupling a plurality of host devices (H1-HN) 22a-c to a plurality of storage devices (SD1-SDN) 24a-c. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage device 24a. Upon becoming activated (e.g., powering up), the host 22a and the storage device 24a may send appropriate signals to the switch(es) of the storage area network 60, and each other, which then allows the host 22a to initiate a data-path connection between the port of the host 22a and the port of the storage device 24a. Zones may be defined in terms of a unique identifier associated with each of the ports, such as such as a 64-bit worldwide port name (WWPN).

In various embodiments, the system described herein may be used in connection with performance data collection associated with data migration and/or data mirroring techniques using a SAN. Data transfer among storage devices, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products include Symmetrix Remote Data Facility (SRDF) products from EMC Corporation.

For further discussion of techniques involving the configuration and use of storage area networks, including virtual storage area networks, reference is made, for example, to U.S. Pat. No. 8,028,062 to Wigmore et al., entitled "Non-Disruptive Data Mobility Using Virtual Storage Area Networks With Split Path Virtualization," which is assigned to EMC Corporation and is incorporated herein by reference, that discloses techniques for the creation of a SAN centric storage virtualization layer that allows data mobility and migration without disruption to one or more hosts servers attached to the SAN. Reference is also made to U.S. Pat. No. 7,441,023 to Benjamin et al., entitled "Method and Apparatus for Modeling and Analyzing MPLS and Virtual Private Networks;" U.S. Pat. No. 7,720,003 to Benjamin et al., entitled "Model-Based Method and Apparatus for Determining MPLS Network Properties;" and U.S. Pat. No. 7,783,778 to Benjamin, entitled "Model-Based Method and Apparatus for Determining Virtual Private Network Topologies," which are assigned to EMC Corporation and are all incorporated herein by reference, that disclose various techniques for discovering and identifying network properties and topologies in a network represented by a model.

Figure 4:
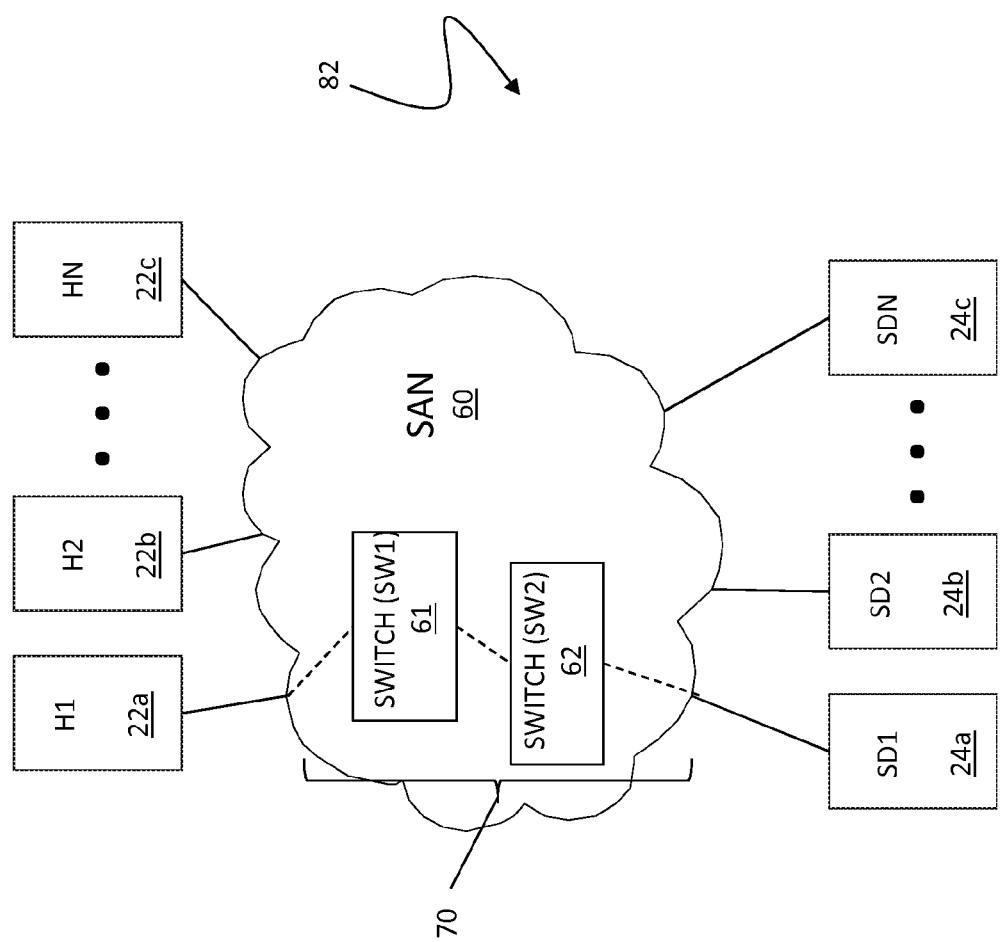
FIG. 4 is a schematic illustration of an embodiment of the SAN shown in FIG. 3 including multiple switches providing an I/O path between a host and a storage device in connection with an embodiment of the system described herein.

FIG. 4 is a schematic illustration 82 showing multiple SAN switches of a SAN, like that of FIG. 3, that may be used in connection with an embodiment of the system described herein. In the illustrated embodiment, the SAN is shown with two switches, switch 61 (SW1) and switch 62 (SW2), that are used in connection with an I/O data path 70 from the host 22a to the storage device 24a. In various embodiments, the switches 61, 62 may include physical and/or logical devices. Although two switches are shown, more (or fewer) than two switches and/or other appropriate elements of a SAN fabric may be used in connection with the providing of I/O data paths from one or more of the hosts 22a-c to one or more of the storages devices 24a-c in connection with path performance data collection according to the system described herein.

The selection and/or identification of the I/O path 70 may be performed according to multiple selection factors and using known path selection techniques. Reference is made, for example, to U.S. Pat. No. 7,688,753 to Zimran et al., entitled "Selection of a Data Path Based on One or More Performance Characteristics of a Computer System," which is assigned to EMC Corporation and is incorporated herein by reference and which discloses techniques for data path selection based on performance characteristics of a computer system using a path selection module. Reference is also made to U.S. Pat. No. 6,434,637 to D'Errico, entitled "Method and Apparatus for Balancing Workloads Among Paths in a Multi-Path Computer System Based on the State of Previous I/O Operations," which is assigned to EMC corporation and is incorporated herein by reference and which discloses techniques for selecting one of at least two I/O data paths for transmission of the next PO operation based upon a state of previously assigned I/O operations queued for transmission over the I/O paths.

Figure 5:
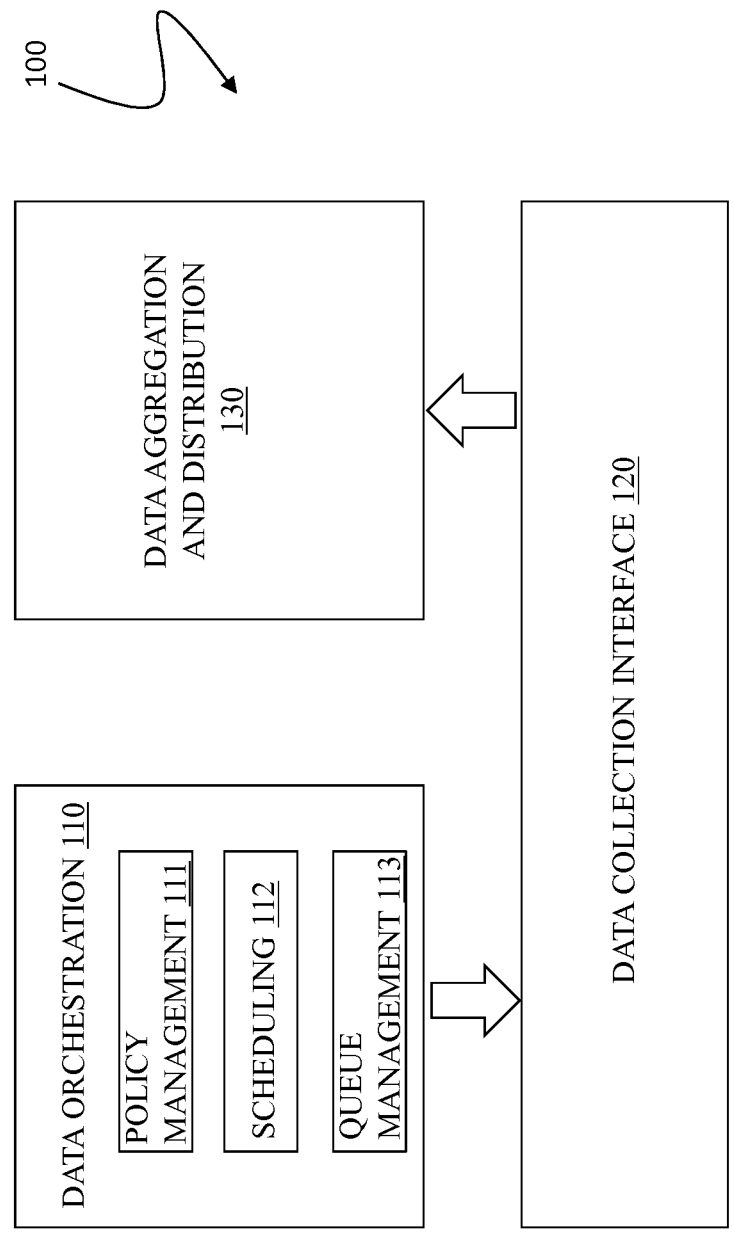
FIG. 5 is a schematic illustration showing a native data collection component according to an embodiment of the system described herein that may be implemented as, for example, a tool, appliance, application and/or utility, and including physical and/or logical implementations thereof.

FIG. 5 is a schematic illustration showing a native data collection component 100 according to an embodiment of the system described herein that may be implemented as, for example, a tool, appliance, application and/or utility, and including physical and/or logical implementations thereof. The native data collection component 100 may be responsible for data orchestration, data collection, and aggregation and distribution of collected data from among multiple sources. Accordingly, the native data collection component 100 may be independent of a particular data source and act as an independent performance characteristic collection mechanism. In particular, the native data collection component 100 is not required to be installed as an agent on any data source of the data collection processing. In an embodiment, the native data collection component 100 may include three devices/sub-components: a data orchestration device 110, a data collection interface 120 and a data aggregation and distribution device 130. Each sub-component may be service based and communication with each service may be done using state-less protocols, such as representation state transfer (REST). The data orchestration device 110, the data collection interface 120 and the data aggregation and distribution device 130 are further discussed in detail elsewhere herein.

In various embodiments, the component 100 may be an application installed on an application host or other computer providing SAN administration and/or management functionality and/or may be implemented as a separate native data collection component functioning according to the features described herein. The system described herein may advantageously avoid the need for one or more data collection agents to be installed and deployed in order to collect storage data from multiple sources. In an embodiment, the component 100 may be used in connection with the ProSphere product produced by EMC Corporation that provides storage resource management functionality. Other storage management products that may be used in connection with the system described herein may include, for example, EMC Ionix products, including the Ionix Unified Infrastructure Manager (UIM). In an embodiment, the statistics used by the component 100 according to the system described herein may be gathered by the component according to the native data collection techniques discussed elsewhere herein.

Reference is made to U.S. patent application Ser. No. 13/335,316 to Lim et al., filed Dec. 22, 2011, and entitled "Path Performance Data Collection," which is assigned to EMC Corporation and is incorporated herein by reference, that discloses controlled tuning performance data collection provided through a single application controller of a path performance data collection tool and may be used in connection with the system described herein. The performance data collection may be turned on or off from the application host running the tool via a user interface. Lim's tool may automatically (e.g., without user intervention) update performance data collection characteristics as the application host I/O data path changes according to user controlled settings but without requiring further user intervention during the updating. Turning on path performance data collection on the application host via the user interface may automatically set up synchronized performance data collection for all managed objects within an I/O data path.

In various embodiments, some data used in connection with the system described herein may obtained using other data collection devices and mechanisms, including products produced by EMC Corporation such as the EMC Workload Analyzer (WLA), the Symmetrix Performance Analyzer (SPA)®, the Symmetrix CLI statistics collection daemon (STP), the Storage Configuration Advisor (SCA) and/or the ProSphere Discovery Engine, among other possible collection devices, applications and/or appliances. Reference is made, for example, to U.S. Pat. No. 6,622,221 to Zahavi, entitled "Workload Analyzer and Optimizer Integration," which is assigned to EMC Corporation and is incorporated herein by reference and which discloses techniques used in connection with evaluating the performance of proposed device swap plans in accordance with past performance data collected.

As shown in FIG. 5, the data orchestration device 110 may be responsible for scheduling, policy management and queue management for the data collection processing and include A policy management unit 111, a scheduling unit 112, and a queue management unit 113. The policy management unit 111 may be an interface that enables customization, for example by a user and/or administrator, of what data is to be collected and the manner in which the data is to be collected. For example, policy management unit 111 may enable the user/administrator to define metrics, objects and/or groups of objects for the data collection. A policy may be defined as a textual representation of a collection from which the data collection framework may act upon. The policy may include: a collection type; a collection objective; a collection start time; a collection priority; a collection interval; and a collection end time. The scheduling unit 112 may provide an interface for scheduling of data collection jobs, including scheduling on a one-time and/or a recurring basis. The queue management unit 113 may provide for control and management of the status of data collection jobs and performance of data collection jobs according to the appropriate policy. For example, the queue manager may determine if a particular job can be run or not based upon defined priorities and the current queue stack.

The data collection interface 120 may be responsible for controlling and managing collection of multiple data collection types. For example, the data collection types may include performance data, discovery data and capacity data. The data collection interface 120 may control and manage the data collection types using software components, such as plug-ins, that may be used to obtain data based on the job in which the collection type is invoked (see, e.g., FIG. 6).

The data aggregation and distribution device 130 may be responsible for processing the information retrieved from the data collection interface 120 and appropriately distributing the information. For example, the information may be distributed to a persistent data store according to a policy. A data aggregation mechanism may obtain data from a data collection plug-in and prepare the data for distribution, A distribution mechanism may then provide the collected data to a requestor, for example to an expectant consumer.

Figure 6:
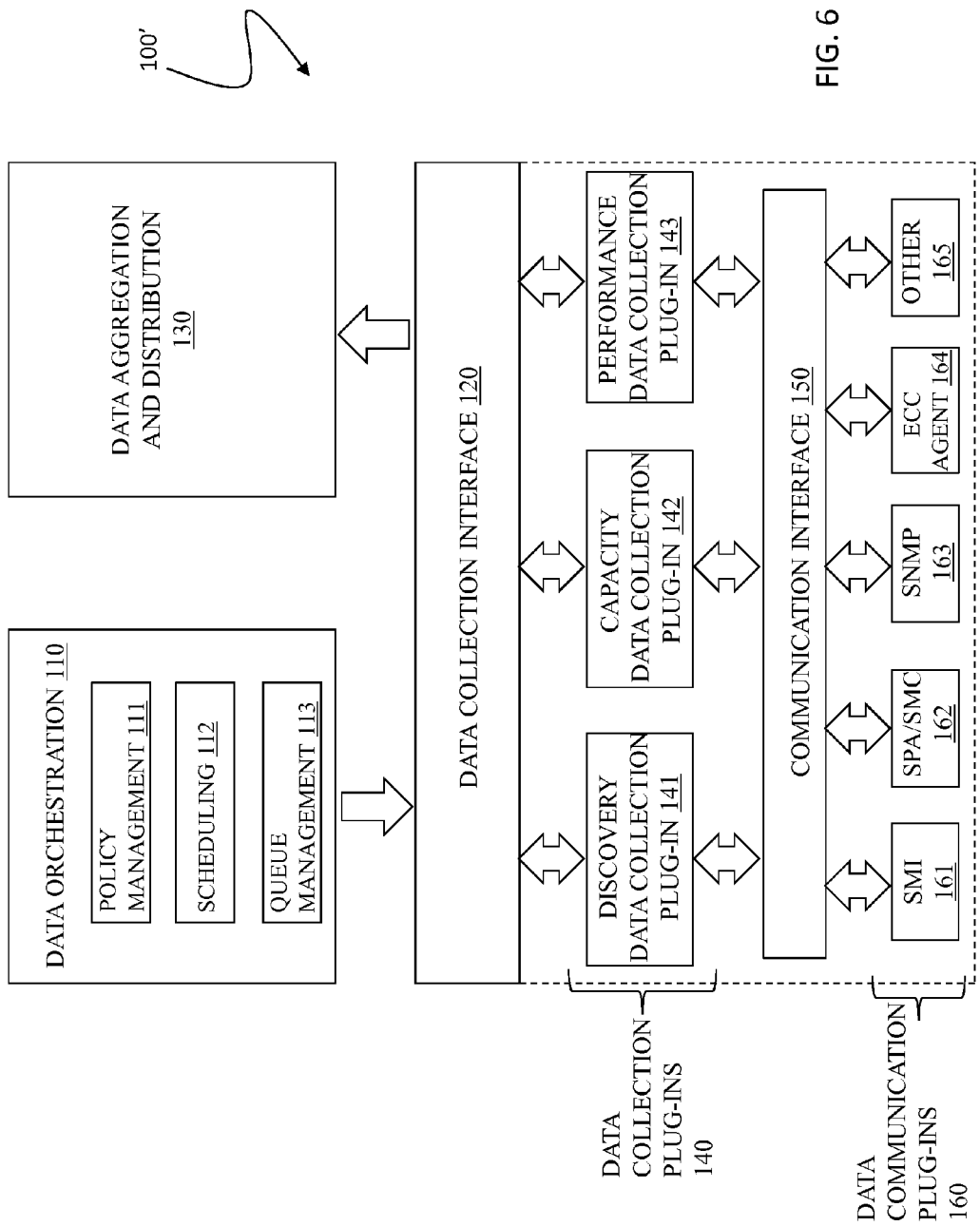
FIG. 6 is a schematic illustration showing an embodiment of the native data collection component.

FIG. 6 is a schematic illustration showing an embodiment 100' of the native data collection component. In the illustrated embodiment 100', in connection with the operation of the data collection interface 120, collection plug-ins 140 are shown that may be used to obtain data based on the job in which the collection type is invoked. The plug-ins may be software components that add specific abilities, as discussed herein, to the data collection interface implementation and enable customization of the functionality thereof. Plug-ins may be created by a user of the native data collection component 100' and may correspond to a desired data collection type. The illustrated collection plug-ins 140 are shown as including a discovery data collection plug-in 141, a capacity data collection plug-in 142 and a performance data collection plug-in 143. Each of the collection plug-ins 140 may operate using a shared communication interface 150 that enables communication of the plug-in to obtain data of the particular collection type invoked and in connection with collection of the data from a particular SAN component.

In various embodiments, the communication interface 150 enables data exchange according to various data collection types using multiple communication mechanisms/protocols. Data communication plug-ins 160 may be used to communicate collected data to the data collection component 100 using the communication interface 150. For example, the data communication plug-ins 160 may include a Storage Management Initiative (SMI) communication plug-in 161 for data communication with SAN arrays, switches and/or other SAN components in connection with data collection. In an embodiment, the performance data collection plug-in 143 may leverage the SMI communication type to mine and collect performance related SMI data. Capacity and discovery data may be similarly collected and leveraged using the corresponding plug-ins. For example, discovery data may be collected that includes: discovered SAN components, I/O paths of discovered hosts, whether the hosts are virtual (e.g., running as guest operating system or a virtual machine (VM)) or not, the hosts' IP addresses, operating systems and versions thereof, and/or whether the host is in a group or cluster, among other discovery data. Other data communication plug-ins that may be used in connection with the communication interface 150, include, for example, a Symmetrix Management Control/Symmetrix Performance Analyzer (SMC/SPA) plug-in 162, a Simple Network Management Protocol (SNMP) plug-in 163, an EMC Control Center (ECC) agent plug-in 164 and/or other plug-in 165.

It is further noted that the system described herein may be used in connection with simulation of data storage systems for evaluation purposes. For example, simulated storage system configurations may be evaluated to determine preferred configurations and/or identify potential problems of a possible I/O data path and/or elements thereof. Suitable data storage system simulation tools that may be used in connection with the system described herein may include systems and methods like that disclosed in U.S. Pat. No. 7,392,360 to Aharoni et al., entitled "Method and System for Capacity Planning and Configuring One or More Data Storage Systems," U.S. Pat. No. 7,292,969 to Aharoni et al., entitled "Method and System for Simulating Performance on One or More Storage Systems," and U.S. patent application Ser. No. 13/065,806 to Smirnov et al., filed Mar. 30, 2011, entitled "Write Pacing Simulation Tool," which are all assigned to EMC Corporation and which are all incorporated herein by reference.

Figure 7:
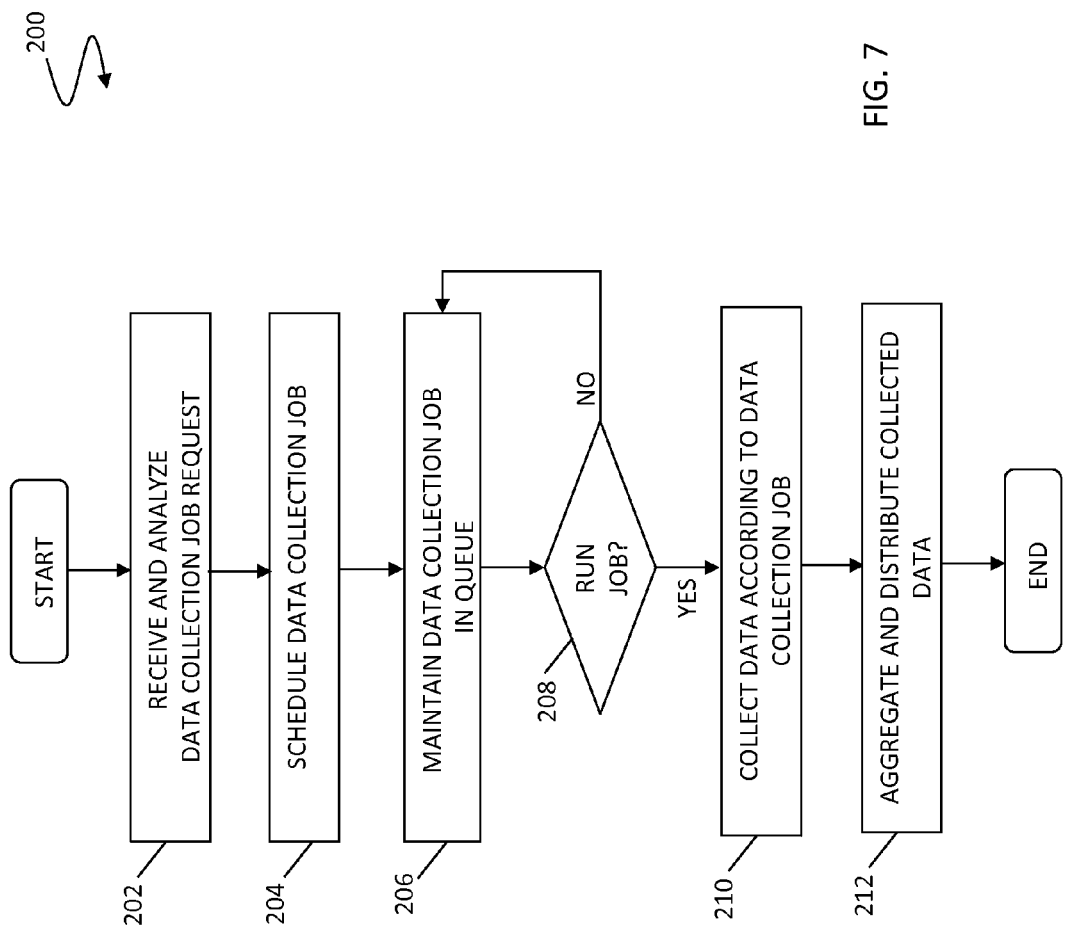
FIG. 7 is a flow diagram showing data collection processing of a data collection job according to an embodiment of the system described herein.

FIG. 7 is a flow diagram 200 showing data collection processing of a data collection job according to an embodiment of the system described herein. At a step 202, a data collection job request is received and analyzed to determine what object and what metrics are to collected and when according to requirements set forth in the job request and/or by other policy requirements. It is noted that the data collection job may be received and/or implemented as part of a trigger event according a policy. After the step 202, processing proceeds to a step 204 where the data collection job is scheduled to run according to certain criteria, such as at a specific time and/or within a specific time window. After the step 204, processing proceeds to a step 206 where the data collection job is maintained in a queue. After the step 206, processing proceeds to a test step 208 where a queue manager determines whether the data collection job can be run or not based upon specific priorities and the current stack queue. If it is determined that the data collection job is not yet ready to be run, processing proceeds back to the step 206. If, at the test step 208, it is determined that the data collection job is ready to be run, then processing proceeds to a step 210 where the data collection is performed according to the data collection job. After the step 210, processing proceeds to a step 212 where data collected from the data collection job processing is aggregated and distributed according to the requirements of the job requestor, for example, distributed to persistent storage. After the step 212, processing is complete.

Figure 8:
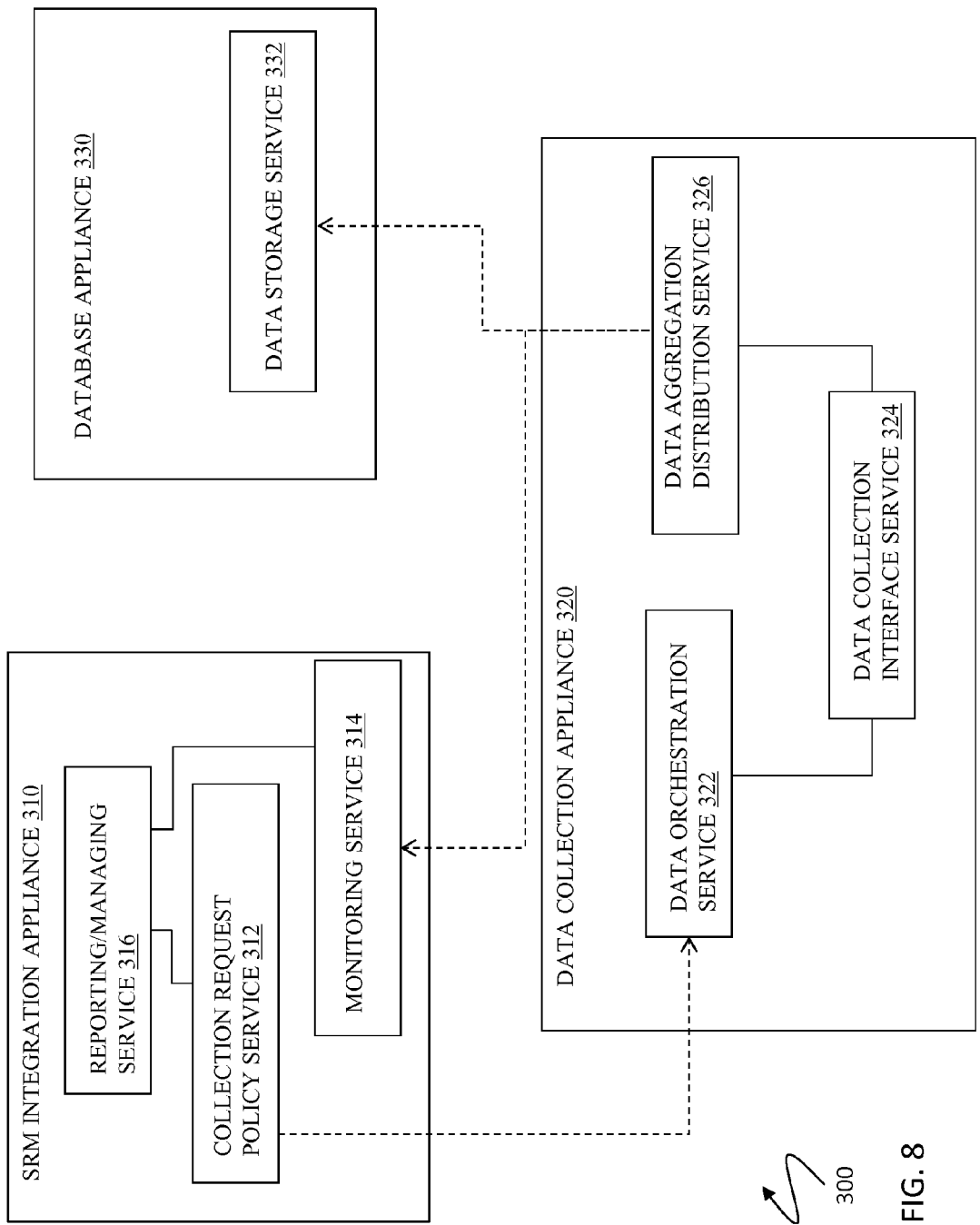
FIG. 8 is a schematic illustration showing deployment of the data collection component in the context of a storage resource management appliance according to an embodiment of the system described herein.

FIG. 8 is a schematic illustration showing deployment of the data collection component in the context of a storage resource management appliance 300 according to an embodiment of the system described herein. The data collection component may be deployed in the form of a virtual appliance. In various embodiments, the storage resource management appliance 300 may be implemented in an Ionix product and/or ProSphere product produced by EMC Corporation that provides for automated resource management tasks such as monitoring, reporting and managing storage resources within a SAN. The storage resource management appliance 300 is shown including a storage resource management (SRM) integration appliance 310, the data collection appliance 310, and a database appliance 330. Each of the appliances may provide services according to the features discussed herein.

The SRM integration appliance 310 may provide a collection request policy service 312 that may control policy creation and/or scheduling in connection with data collection triggering events. In various embodiments, triggering events may include aspects of a SAN exceeding or falling below specified performance thresholds, a data transmission disruption event, and/or a manual activation of a data collection request, among other appropriate triggering events. A monitoring service 314 may receive data collection results from the data collection appliance 320 and a reporting/managing service 316 may control reporting and/or managing functions of storage resources being managed by the SRM product. The data collection appliance 320 may include services corresponding to the devices of the native data collection component 100, 100' discussed elsewhere herein, including a data orchestration service 322, a data collection interface service 324, and an aggregation and distribution service 326. Collected data from the data collection appliance 320 may be distributed to the monitoring service 314 of the SRM integration appliance 310 and/or may be stored in persistent storage as controlled by a data storage service 332 of the database appliance 330. Stored collection data may be used, for example, in connection with historical and/or trend data collection reporting by the reporting/managing service 316.

Figure 9:
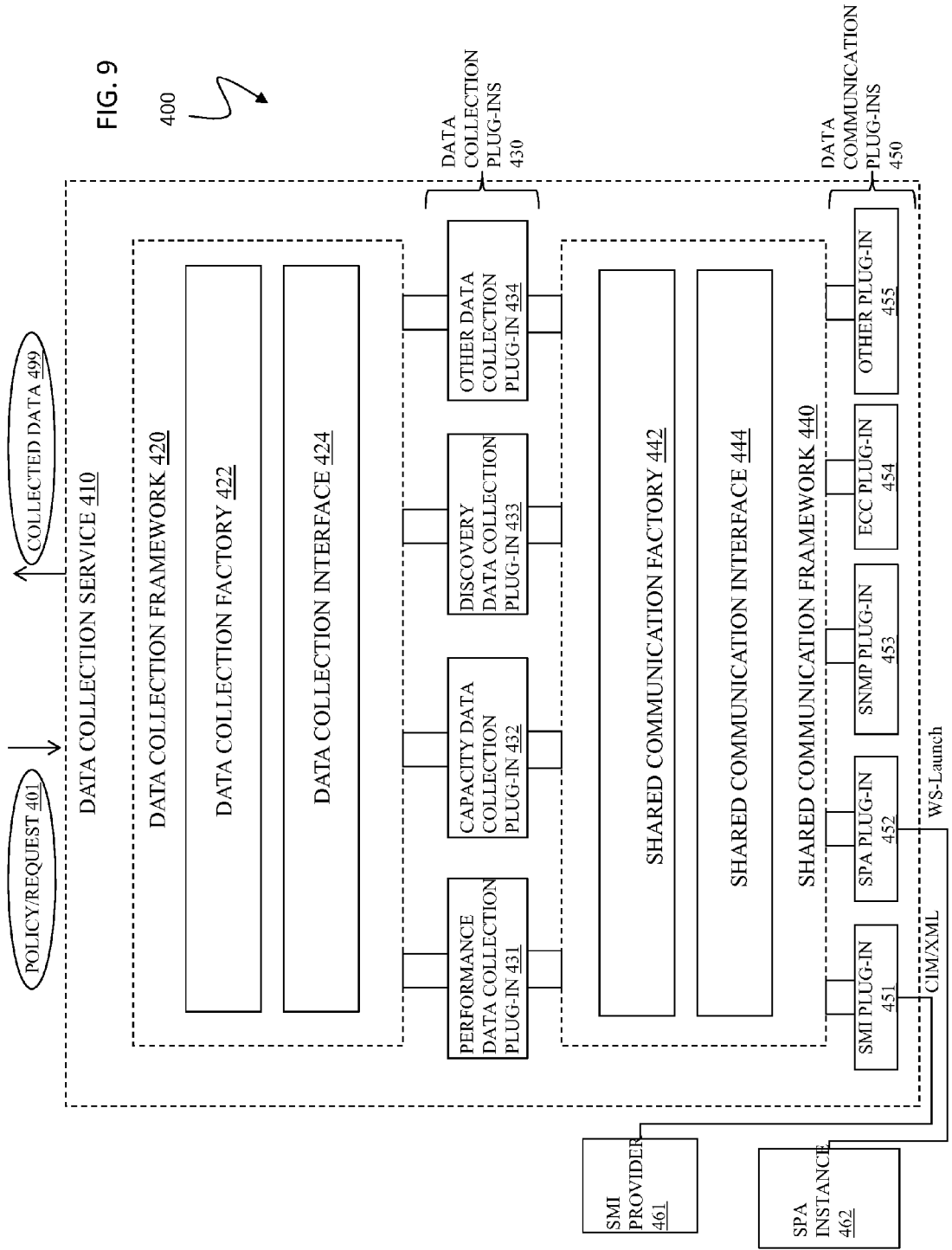
FIG. 9 is a schematic illustration showing the framework operations of a data collection service according to an embodiment of the system described herein.

FIG. 9 is a schematic illustration showing the framework operations of a data collection service 400 according to an embodiment of the system described herein. The data collection service 410 may expose collected data 499 through a push/pull mechanism in which an event may trigger the beginning of data collection based on an incoming instance of a policy or request 401. The policy/request may define what, when and how the data collection would occur and may instantiate an appropriate data collection object type as triggered by an event. For example, following a trigger event, a policy could instantiate data collection according to the following information: {"Performance", "ClariionABC", "12:00 pm", "SMI", [root, password]}, indicating that performance data is to be collected for the ClariionABC device at 12:00 pm using SMI communication and providing credential information. A data collection framework 420 may be used to implement the data collection service 410. Data collection plug-ins 430 may be created in the data collection framework 420 using a data collection factory 422 and accessed using the data collection interface 424. The data collection plug-ins 420 may include a performance data collection plug-in 421, a capacity data collection plug-in 422, a discovery data collection plug-in 423 and/or other appropriate data collection plug-in 424. The data collection plug-ins 420 may be created according to an implementation pattern common across the plug-ins and enabling independent and shared access using the data collection interface 424. An example data collection implementation pattern for a data collection plug-in may be:
DataCollectionFactory dcf=new DataCollectionFactory ( );
DataCollector dc=dcf.getCollector("Performance");
Collection c=dc.collect(myCollectionPolicy);
...
In the above, performance data collection is instantiated with a performance data collection plug-in and the policy ("myCollectionPolicy") is realized as a policy object.

Both collection data types and communication types may be defined by the incoming policy. As shown in the figure, data communication plug-ins/communicators 450 may be similarly created using a shared communication framework 440. The data communication plug-ins 450 may be created using a shared communication factory 442 and accessed using a shared communication interface 444. The data communication plug-ins 450 may include an SMI plug-in 451, an SPA plug-in 452, an SNMP plug-in 453, an EMC Control Center (ECC) agent plug-in 454, and/or other appropriate plug-in 455. In an embodiment, an implementation pattern for the communication plug-ins may follow a similar patterns as discussed in connection with the data collection plug-ins, specifically:
DataCommunicationFactory dcf=new DataCommunicationFactory ( );
DataCommunicator dc=dcf.getCommunicator("SMI");
Collection c=dc.getInstances(myCollectionPolicy);
...
For example, in the above-noted, the SMI collection plug-in 441 may communicate using Common Information Model (CIM)/Extensible Markup Language (XML) with an SMI provider 461 to obtain the collection data therefrom according to the policy. In another example, the SPA plug-in 452 would communicate with an SPA instance 462 using an appropriate protocol, such as WS-Launch, which is a proprietary protocol. Accordingly, the data collection service 410 enables collection and communication processing to collect desired data according to the appropriate data collection and communication type.

The collected data 499 may then be exposed, for example using a data service RESTlet, and may be either pushed to or pulled by an existing consumer service. It is noted that, in an embodiment, the system described herein may perform functions of Network-Attached Storage (NAS) components in an advantageous and efficient way. For example, NAS detection and discovery may be formed by the Data Collection Service using the SMI data collection communication interface plug-in, while need for a NAS Management Service may be avoided through use of the data collection interface discussed elsewhere herein.

FIGS. 10A and 10B are schematic illustrations showing a domain model, outlining the framework package structures for implementing the data collection framework and the shared communication framework according to various embodiments of the system described herein. In FIG. 10A, an embodiment for the structure of a data collection package 510 is shown. Structures are shown for functional implementation of the data collection interface (DataCollectionInterface), a data collection plug-in (DataCollectionPlug-in), the data collection factory (DataCollectionFactory) and the performance collection implementation (PerformanceCollImpl). In FIG. 10B, an embodiment for the structure of a communication package 520 is shown. Structures are shown for functional implementation of the shared communication interface (DataCommInterface), a data communication plug-in (DataCommPlug-in), the shared communication factory (DataCommFactory) and a SIM communication implementation (SIMCommImpl).

The system described herein provides embodiments that perform native storage data collection processing in a flexible and efficient manner and provide multiple advantages. For example, embodiments of the system described herein may provide end-users with the ability to choose and manage different metric sets for data collection and at scheduled intervals. End-users may be provided with the ability to collect data based on logical groupings. Collections may synchronized at particular times and end-users may be provided with the ability to see collected metric data at periodic intervals. End-users may be provided with the ability to obtain metrics using industry standard mechanisms and non-industry standard mechanisms and may obtain metrics using both agent and agentless mechanisms End-users may be provided with the ability to attach priorities (using policies) to particular data collection jobs. Performance data collection for I/O data paths in a SAN is supported by the system described herein. Users may be able to identify host data paths of interest and collect data for hosts, switches, arrays and/or other SAN components on the data paths at a desired (scheduled) frequency. The system enables collection and distribution of data for a particular request independent of the time sequence order of other collection requests.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for performing native data collection, comprising:
   receiving a request for data collection;
   identifying characteristics for collection according to the request;
   instantiating, using at least one processor, at least one data collection plug-in of a plurality of data collection plug-ins installed in a native data collection component to collect identified data directly from at least one data source of multiple data sources of at least one storage area network (SAN) according to the characteristics identified from the request, the native data collection component being located separately from the multiple data sources of the at least one storage area network (SAN);
   the at least one data collection plug-in collecting the identified data using a sharable communication interface that is usable to access data from the multiple data sources that operate using different communication protocols, wherein the data collection plug-ins for collecting the identified data are each installed in the native data collection component independently of the multiple data sources, and wherein all elements of the native data collection component, including the data collection plug-ins of the native data collection component, are not deployed into the at least one SAN as agents of any of the multiple data sources.

2. The method according to claim 1, wherein the request is provided according to a policy in response to a triggering event.

3. The method according to claim 1, where the identified data is storage data of a storage area network.

4. The method according to claim 1, wherein the characteristics include at least one of: performance data, capacity data or discovery data.

5. The method according to claim 1, wherein the plurality of data collection plug-ins include a performance data collection plug-in, a capacity data collection plug-in and a discovery data collection plug-in.

6. The method according to claim 1, wherein at least one of the multiple data sources is accessed via the sharable communication interface using at least one data communication plug-in.

7. The method according to claim 1, further comprising:
   aggregating and distributing the collected data responsive to the request.

8. A non-transitory computer readable medium storing software for performing native data collection, the software comprising:
   executable code that receives a request for data collection;
   executable code that identifies characteristics for collection according to the request;
   executable code that instantiates at least one data collection plug-in of a plurality of data collection plug-ins installed in a native data collection component to collect identified data directly from at least one data source of multiple data sources of at least one storage area network (SAN) according to the characteristics identified from the request, the native data collection component being located separately from the multiple data sources of the at least one storage area network;
   executable code that causes the at least one data collection plug-in to collect the identified data using a sharable communication interface that is usable to access data from the multiple data sources that operate using different communication protocols, wherein the data collection plug-ins for collecting the identified data are each installed in the native data collection component independently of the multiple data sources, and wherein all elements of the native data collection component, including the data collection plug-ins of the native data collection component, are not deployed into the at least one SAN as agents of any of the multiple data sources.

9. The non-transitory computer readable medium according to claim 8, wherein the request is provided according to a policy in response to a triggering event.

10. The non-transitory computer readable medium according to claim 8, where the identified data is storage data of a storage area network.

11. The non-transitory computer readable medium according to claim 8, wherein the characteristics include at least one of: performance data, capacity data or discovery data.

12. The non-transitory computer readable medium according to claim 8, wherein the plurality of data collection plug-ins include a performance data collection plug-in, a capacity data collection plug-in and a discovery data collection plug-in.

13. The non-transitory computer readable medium according to claim 8, wherein at least one of the multiple data sources is accessed via the sharable communication interface using at least one data communication plug-in.

14. The non-transitory computer readable medium according to claim 8, further comprising:
   executable code that aggregates and distributes the collected data responsive to the request.

* * * * *